(12) United States Patent
Jennen

(10) Patent No.: US 7,376,360 B2
(45) Date of Patent: *May 20, 2008

(54) OPTICAL DEVICE FOR EXTRACTING A SIDEBAND SIGNAL FROM A COMPOSITE SIGNAL INCLUDING ORTHOGONALLY MODULATED SIGNALS

(75) Inventor: Jean Gerardus Leonardus Jennen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 540 days.

This patent is subject to a terminal disclaimer.

(21) Appl. No.: 11/018,028

(22) Filed: Dec. 21, 2004

(65) Prior Publication Data

US 2005/0238364 A1   Oct. 27, 2005

Related U.S. Application Data

(63) Continuation-in-part of application No. 10/832,156, filed on Apr. 26, 2004.

(51) Int. Cl.
*H04B 10/06* (2006.01)
(52) U.S. Cl. .................. 398/205; 398/202; 398/203; 398/204; 398/207; 398/210; 398/214
(58) Field of Classification Search ......... 398/202–214
See application file for complete search history.

(56) References Cited

U.S. PATENT DOCUMENTS 7,043,099 B1 * 5/2006 Watanabe .................... 385/11

7,167,651 B2 * 1/2007 Shpantzer et al. ............ 398/77
2004/0071472 A1 * 4/2004 Ito .............................. 398/161
2006/0274318 A1 * 12/2006 Jensen et al. ................ 356/477

OTHER PUBLICATIONS

D. J. Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

H. J. Lee, "A Simple All-Optical Label Detection and Swapping Technique Incorporating a Fiber Bragg Grating Filter", IEEE Photonics Technology Letters, vol. 13, No. 6, Jun. 2001, pp. 635-637.

(Continued)

*Primary Examiner*—Kenneth Vanderpuye
*Assistant Examiner*—Phyowai Lin

(57) ABSTRACT

An optical device extracts an information bearing sideband such as an FSK or SCM signal (label) from a composite signal that includes the sideband and an orthogonally modulated signal such as an intensity modulated signal (payload) by employing polarization beam splitting and polarization transformation. Polarization transformation is accomplished by splicing the optical signal into a polarization maintaining fiber at a desired angle so that it is separated into two orthogonal polarizations that experience differential group delay in the fiber. The fiber is characterized by a beat length $L_{beat}$ and the fiber is designed to have a length substantially equal to $(L_{beat} \times f_c)/2\delta f$, wherein the sidebands of the composite signal are separated by a wavelength difference $\delta f$ and $f_c$ is the nominal center frequency of the composite signal. This device has been shown to be useful for extracting GMPLS LSC level wavelength labels from either an FSK/IM composite signal or an SCM/IM composite signal.

12 Claims, 7 Drawing Sheets

OTHER PUBLICATIONS

T. Koonen, et al., "Optical Packet Routing in IP-Over-WDM Networks Deploying Two-Level Optical Labeling", Proc. of ECOC '01, Paper Th. L. 2.1, Sep. 30, 2001.

Sulur, "Combined ASK/FSK and ASK/DPSK Modulation Formats for Optically Labeled Signals", Proc. ONDM '2002, Feb. 4, 2002.

R. Hui et al., "PMD-Insensitive SCM Optical Receiver Using Polarization Diversity", IEEE Photonics Technology Letters, vol. 14, No. 11, Nov. 2002, pp. 1632-1634.

S. J. Ben Yoo, "High-Performance Optical-Label Switching Packet Routers and Smart Edge Routers for the Next-Generation Internet", IEEE Journal of Selected Areas in Communications, vol. 21, No. 7, Sep. 2003, pp. 1041-1051.

K. Vlachos, "An Optical IM/FSK Coding Technique for the Implementation of a Label-Controlled Arrayed Waveguide Packet Router", Journal of Lightwave Technology, vol. 21, No. 11, Nov. 2003, pp. 2617-2628.

* cited by examiner

OPTICAL DEVICE FOR EXTRACTING A SIDEBAND SIGNAL FROM A COMPOSITE SIGNAL INCLUDING ORTHOGONALLY MODULATED SIGNALS

CROSS-REFERENCE TO RELATED APPLICATION

This application is a continuation-in-part of U.S. patent application Ser. No. 10/832,156 filed on Apr. 26, 2004, which is commonly assigned herewith.

BACKGROUND OF THE INVENTION

1. Field of the Invention

This invention relates to an optical device for extracting information carried in sidebands or tones within a composite signal exhibiting multiple types of signal modulation and, more particularly, to an optical device adapted to extract optically either a frequency shift keying (FSK) modulated signal from a composite FSK/IM (intensity modulated) signal or a sub-carrier modulation (SCM) signal from a composite SCM/IM signal.

2. Description of the Related Art

Data networks and optical networks are converging in an attempt to evolve the optical Internet of the future. As such, future optical data communication links are likely to operate on burst mode traffic as opposed to the regular, periodic traffic found in conventional time-division-multiplexed (TDM) networks. In order to handle the burst mode traffic efficiently, asynchronous connections will replace synchronous connections between network nodes in the optical data networks such as packet switched networks.

One promising technique for implementing these packet switched networks involves putting the data arranged in an internet protocol (IP) format or in any other kind of packet format directly onto an optical wavelength division multiplexed (WDM) channel. This technique avoids any involvement with the Synchronous Digital Hierarchy (SDH) and Asynchronous Transfer Mode (ATM) transport layers. IP-over-WDM is supported by an optical multi-protocol label switching protocol (MPLS) formerly known as MPAS protocol, an optical multi-protocol wavelength switching protocol and now part of Generalized Multi-Protocol Label Switching (GMPLS) particularly with reference to the Lambda-Switched Capable (LSC) level.

Generalized Multiprotocol Label Switching (GMPLS) is the next-generation implementation of Multiprotocol Label Switching (MPLS). GMPLS extends the functionality of MPLS to include a wider range of label-switched path (LSP) options for a variety of network devices. GMPLS labels and LSPs can be processed at four levels. The levels are Fiber-Switched Capable (FSC), Lambda-Switched Capable (LSC), Time Division Multiplexing Switched Capable (TDM), and Packet-Switched Capable (PSC).

According to the GMPLS protocol at the LSC level, wavelength-switched channels can be established in a similar way as label-switched paths in the conventional MPLS protocol. In GMPLS systems, packets can be marked with an optical label that can be swapped in every network node. Thus, end-to-end optical paths can be set up along which the data can be routed transparently through the network. Currently, several label marking techniques for optical label switching have been investigated and two techniques of interest herein are Subcarrier Multiplexing (SCM) and Frequency Shift Keying (FSK).

In both label marking techniques considered for optical label switching, label data is modulated as two optical frequencies (generally called optical tones) symmetrically distributed about a central optical frequency fc (generally known as the channel frequency or carrier frequency). The payload of packet data is modulated, generally by an intensity modulation technique such as amplitude shift keying (ASK), onto the optical signal in the region at or around the central optical frequency. An exemplary composite optical signal bearing the payload in the central portion of the composite signal and the label in the sidebands of the composite signal is shown in FIGS. 1 and 2 for the SCM and FSK label marking techniques, respectively, on an IM payload.

At each network node, it is necessary only to process the optical label that encapsulates all switching and routing information for the packet, while the payload portion of the optical packet remains unaffected in the optical domain. Processing has been carried out in exemplary systems by using optical filters tuned to the label and payload optical frequencies. This technique however has several disadvantages, namely, the loss of optical power, the duplication of components for each operation, and the need for tuning. Optical power is lost because the incoming signal is split between two paths—one for the label processing and one for the payload processing. The processing operation in each path necessarily discards the unwanted signal (label or payload) while extracting the wanted portion. Tuning to the channel frequency must be maintained at the correct optical frequency, whether for the FSK tones or the SCM sidebands. If the center frequency is changed to a different WDM channel, the optical filters must be retuned in a difficult and slow process.

Fiber Bragg gratings have been suggested for use in label extraction by exploiting the reflection and transmission functions of the gratings. This approach is considered lossless in the sense that the fiber Bragg grating has two output ports that one can match with the label optical frequency and the payload frequency. But the suppression ratio depends mainly on the manufacturing process. Current grating designs provide adequate, but not ideal, suppression ratios. It should be noted that grating designs have a finite suppression ratio which can be adequate for detection. This suppression can be, for example, −30 dB to −45 dB and depends on the manufacturing process, materials used and other design parameters.

The techniques discussed above do not exhibit efficiency in separating labels from packet payloads in a lossless way and they do not yield adequate extinction ratios between the two optical label tones in the case of FSK. Whether using optical filters or Bragg gratings to realize the label and payload separation function, one is required to tune the payload and label separation devices precisely to each new WDM channel. When the WDM system requires different channel spacing, the payload and label separation devices must be retuned to the new channel frequencies even though the spacing of FSK tones or SCM sidebands remains the same regardless of WDM channel spacing as with ITU channels, for example. There is no known technique for simply realizing a device that exhibits a periodic filtering function that would filter the label tones without retuning to the new WDM channel frequency.

SUMMARY OF THE INVENTION

Simplicity of design, periodic filtering, improved extinction ratios, and substantially lossless operation are all achieved in an optical device that extracts an information bearing sideband such as an FSK or SCM signal (e.g., a label signal) from a composite signal that includes the information bearing sideband and an orthogonally modulated signal such as an intensity modulated signal (e.g., a payload signal) in accordance with the principles of the present invention by splicing the composite signal into a polarization maintaining fiber at a desired splice angle so that the composite signal is separated into two orthogonal polarizations that experience differential group delay via the birefringence of the fiber. The polarized output signals from the fiber are then further processed by judicious coupling to a polarization beam splitting element at an equivalent or complementary angle to the desired splice angle so that one sideband of the composite signal appears at a first output of the beam splitting element while another sideband appears at a second output of the beam splitting element. The sidebands can then be converted to an electrical data signal by using an appropriate receiver such as a balanced receiver for FSK signals. In experimental practice, this device has been shown to be useful for extracting optical labels from either an FSK/IM composite signal or an SCM/IM composite signal.

In one embodiment of the present invention, an input polarization beam splitter is coupled to the polarization maintaining fiber which, in turn, is coupled to an output polarization beam splitter. The coupling at each end of the fiber is made at approximately 45° to one polarization axis of the fiber. The fiber is characterized by a beat length $L_{beat}$ and the fiber is designed to have a length substantially equal to $(L_{beat} \times f_c)/2\delta f$, wherein the sidebands of the composite signal are separated by a predetermined wavelength difference $\delta f$ and $f_c$ is the nominal center frequency of the composite signal, that is, of the optical channel. These tones can then be supplied to the inputs of an appropriate receiver to completely recover the label.

Another embodiment providing substantially lossless performance is realized by utilizing both output ports of the input polarization beam splitter. The output ports of the input polarization beam splitter are each coupled to separate polarization maintaining fibers which, in turn, are each coupled to separate output polarization beam splitters. Optical signals representing the separated tones (two output signals per tone) are supplied by the four output ports of the output polarization beam splitters to a receiver. One FSK receiver arrangement comprises a double balanced receiver coupled to a transimpedance amplifier, whereas the other FSK receiver arrangement comprises a single balanced receiver coupled to a transimpedance amplifier. In the latter arrangement, common output signals from the output polarization beam splitters are combined in an optical coupler or a polarization beam splitter before being supplied to the single balanced receiver. The coupler would introduce a 3 dB loss whereas the polarization beam splitter would introduce no additional loss.

In another embodiment, a single polarization maintaining fiber is employed in a bidirectional mode in order to eliminate the need to provide substantially closely matched fibers in the device and thereby improve the performance of the optical device. Also, the bidirectional nature of the interconnecting fibers and the polarization beam splitters is utilized in this improved embodiment. The input signal is received by a three-port device such as an optical circulator and output directly to the input polarization beam splitter. Orthogonally polarized output signals from the input polarization beam splitter are supplied to separate intermediate polarization beam splitters. One output from one of the intermediate polarization beam splitters is coupled to the complementary output from the other polarization beam splitter via a single polarization maintaining fiber attached at a predetermined splice angle at each end. The remaining output of each polarization beam splitter is coupled to output polarization beam splitter. The device outputs are at the output port of the output polarization beam splitter and at the third port of the circulator. In SCM operation, the optical tones appear at one output of the device and the payload appears at the other output. In FSK operation, each optical tone appears at one or the other of the device outputs.

BRIEF DESCRIPTION OF THE DRAWINGS

A more complete understanding of the invention may be obtained by reading the following description of specific illustrative embodiments of the invention in conjunction with the appended drawings in which.

Figure 1:
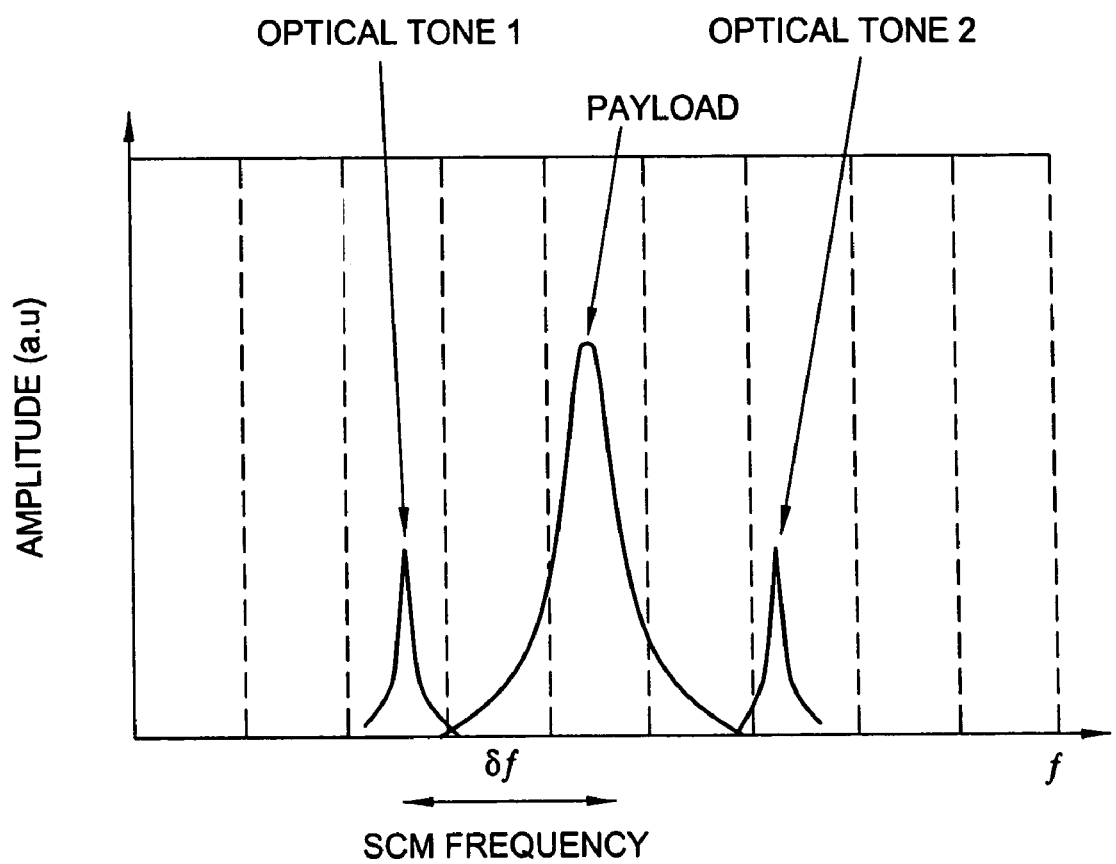
FIG. 1 shows an exemplary optical spectrum for an optical channel bearing SCM modulated information together with IM information.

It is to be noted, however, that the appended drawings illustrate only typical embodiments of this invention and are therefore not to be considered limiting of its scope, for the invention may admit to other equally effective embodiments. Where possible, identical reference numerals have been inserted in the figures to denote identical elements.

DETAILED DESCRIPTION

Figure 2:
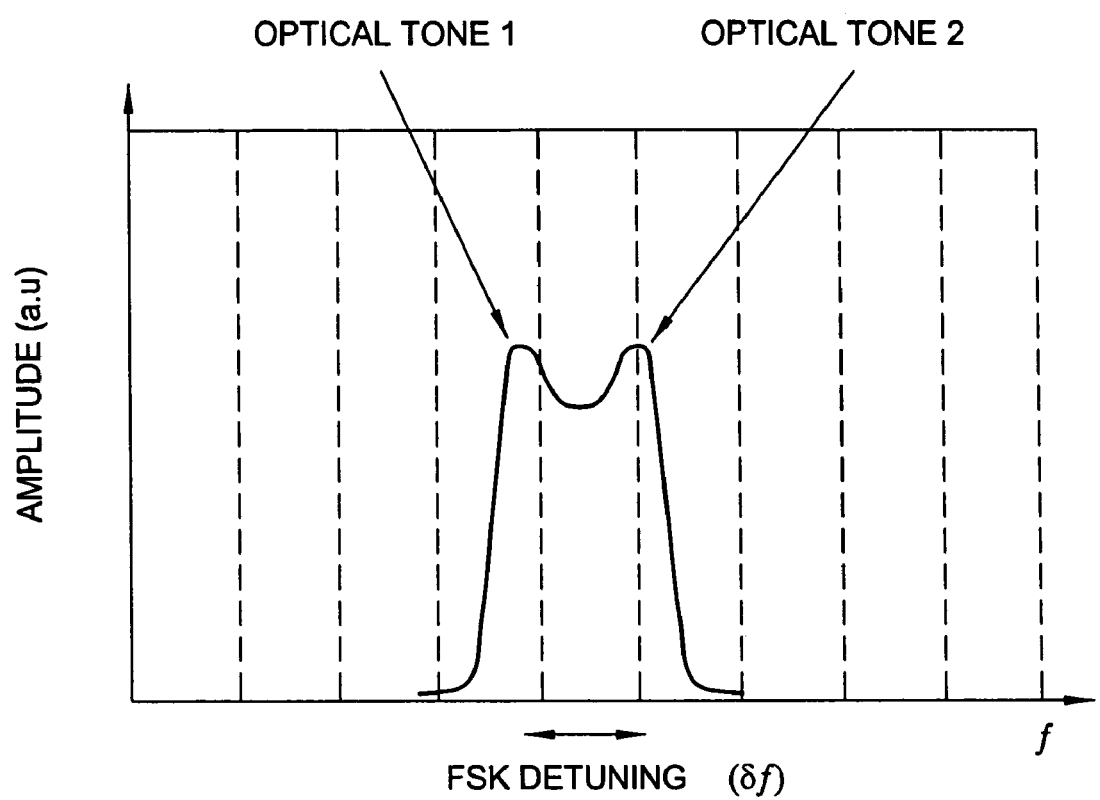
FIG. 2 shows an exemplary optical spectrum for an optical channel bearing FSK modulated information together with IM information.

The present invention is directed to the extraction or separation of information contained in one or more sidebands of a composite signal in which multiple groups of information are optically modulated orthogonally to form the composite signal in an optical channel. Examples of such composite signals include but are not limited to SCM/IM signals and FSK/IM signals. In the former case as shown in FIG. 1, the dual sidebands contain sub-carrier modulated information wherein each sideband is located $\delta f$ from the center frequency of the channel, $f_c$. In the latter case as shown in FIG. 2, the dual sidebands contain frequency shift keying information (label) wherein each sideband is located $\delta f/2$ from the center frequency of the channel, $f_c$. It should be understood by those skilled in the art that the payload for FSK/IM is an intensity modulated signal occurring across the sidebands. In the SCM examples that are useful in GMPLS systems, the sidebands contain the label information whereas the IM signal situated about the center frequency of the channel contains the payload information.

It should be noted, at this point, that wavelength and frequency are used interchangeably throughout the specification and claims and the terms are related by the expression $f=c/\lambda$, where c is the speed of light in a vacuum or in a material. In addition, the frequency difference is related to the wavelength difference approximately as follows: $\delta f \cong c \delta \lambda/\lambda$ where $\delta f << f$.

Sidebands are understood to represent separately modulated information groups that are displaced from the center frequency of the channel by a specific frequency amount. In the optical packet-switched network example described above relating to IP over WDM using GMPLS, the sidebands contain wavelength label information that is useful to the nodes of the data switching network. The payload information is generally concentrated about the center frequency of the channel by using a form of intensity modulation such as amplitude shift keying or the like. In the description that follows, the terms "sidebands", "tones", and "label" or "label signal" may be used interchangeably to denote the same concept.

In the description below, it should be noted that the exemplary configuration of the optical filter in combination with the receiver is optimized for FSK/IM and SCM optical systems. In this device, extraction of the sideband information can be loss-less for the two optical sideband frequencies with ideal extinction when applied to either FSK or SCM data. Ideal suppression ratio between the rejected payload frequency and the sidebands is achieved for SCM. For FSK, ideal suppression between the two sidebands is achieved. The device also exhibits a periodic transmission function which makes the optical device attractive for use at any operating wavelength on an n-δf grid that also has the desired sideband frequency spacing.

In the description of the present invention presented below, the exemplary embodiments of the invention will be explained generally in reference to an IP over WDM packet switched system employing GMPLS where the wavelength label is modulated orthogonally to the payload in sidebands of the composite signal as shown in FIGS. 1 and 2. The exemplary modulation described below is FSK for the label. This description is intended to be illustrative, but not limiting, of the uses for this invention.

Figure 3:
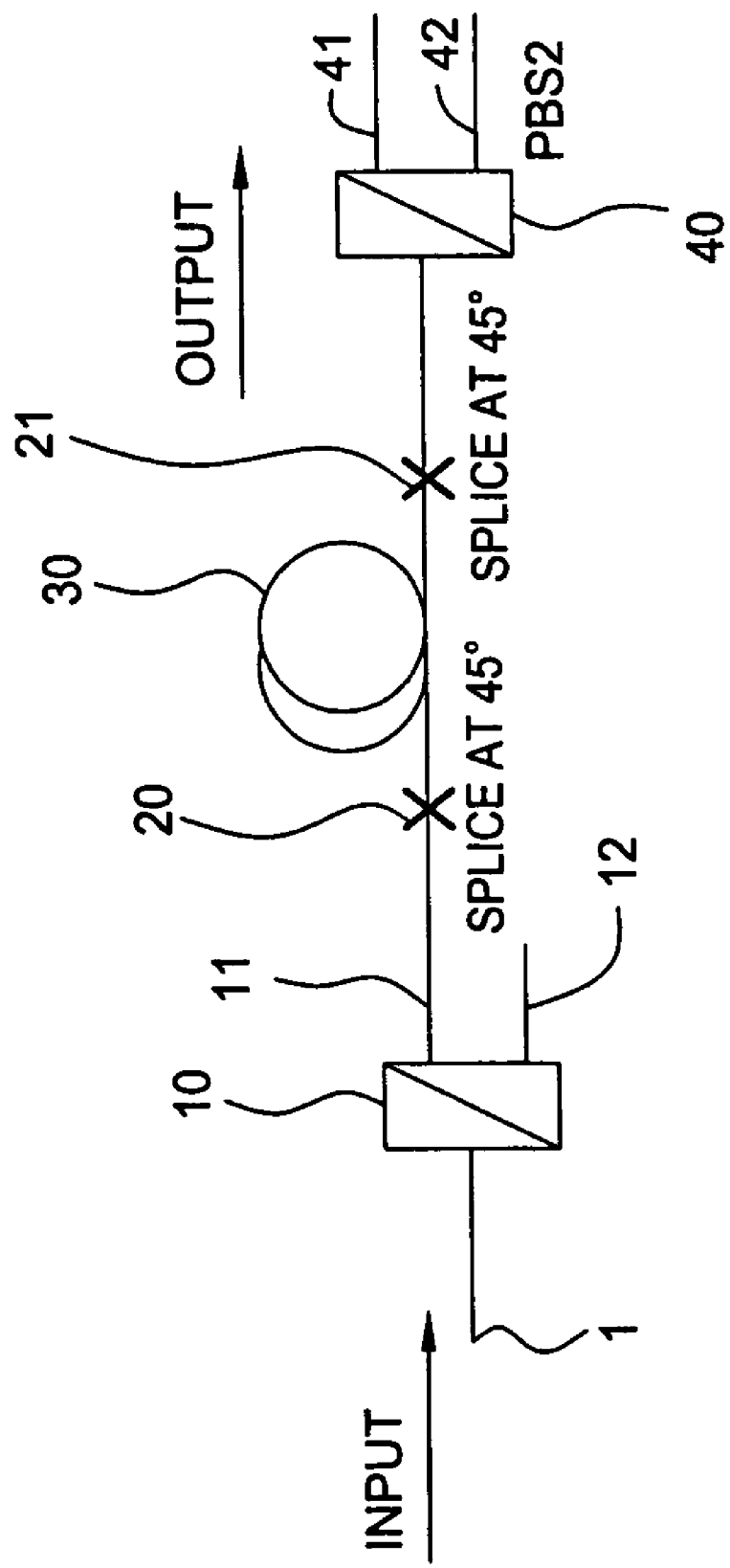
FIGS. 3 through 7 depict alternate embodiments of optical devices realized in accordance with the principles of the present invention.

In order to achieve efficient label detection in accordance with the principles of the present invention, it is possible to use an optical filter comprising a polarization maintaining fiber coupled at preferred input and output coupling angles together with input and output polarization beam splitting elements as shown in FIG. 3. The optical filter shown in FIG. 3 performs an optical extraction of the label information residing in the sidebands of the composite signal. The optical filter includes input and output polarization beams splitters (elements 10 and 40, respectively) coupled to a prescribed length of polarization maintaining fiber (element 30) at preferred coupling angles at the fiber input and output (reference numerals 20 and 21, respectively).

Polarization beam splitters are well known in the art. They are characterized by two output ports that supply one or two orthogonal polarizations of an input signal. If the input signal is confined to a single polarization, then the output signal will appear at only one of the output ports corresponding to that polarization.

It is assumed that the composite signal can vary in polarization. That is, the composite signal is not strictly constrained to a TE or TM optical polarization. When the composite signal is input at input 1 to polarization beam splitter 10, the composite signal will be separated into its constituent TE and TM polarizations. Unless the input polarization of the composite signal is controlled prior to polarization beam splitter 10 or happens to be in a single polarization state, some portion of the signal will possibly be separated by polarization beam splitter 10 and appear at the unused output port 12. This will reduce the power of the signals available at the filter output (output ports 41 and 42) over the optimum case where the composite signal is input to polarization beam splitter 10 in a single polarization so that it appears only at output port 11.

Input and output ports for each of the polarization beam splitters are understood to include a short length of optical fiber called a pigtail. In an example from experimental practice, it is preferable to have the pigtails realized by polarization maintaining fiber.

As shown in FIG. 3, the filter includes L meters of polarization maintaining fiber 30 coupled to two polarization beam splitters 10 and 40 with their axes spliced at a preferred coupling angle of 45° with respect to the axes of the polarization maintaining fiber. Input polarization beam splitter 10 is used for aligning the incoming light in a single polarization to the desired coupling angle of 45° at the polarization maintaining fiber, whereas the output polarization beam splitter 40 is used to selectively process the orthogonal signals traveling on the two axes of the polarization maintaining fiber and output the separate sidebands at different output ports of splitter 40. By coupling fiber 30 to the input port of polarization beam splitter 40 at a preferred angle of 45° to the polarization axes of the fiber, it is possible to add and subtract the related orthogonal vector components of the two signals on both polarization axes of the fiber due to the 45° rotation in coupling between the fiber and polarization beam splitter 40.

Coupling between the fiber and the input and output beam splitters is shown by reference numerals 20 and 21. The coupling can be formed by any type of splice or hardware optical coupler known in the art. It is contemplated that these splices can also be accomplished using polarization rotation devices, which typically increase complexity and cost of the design while increasing insertion loss. But it should be understood that it is desirable to minimize the amount of loss introduced by the couplings. The preferred angle of coupling is 45° to the fiber axes. In experimental practice, it has been determined that the coupling angles at splices 20 and 21 should be equal in magnitude and opposite in sign. That is, if splice 20 is at a 45° angle to the polarization axes of the fiber, then splice 21 should be at a −45° angle to the polarization axes of the fiber. It is contemplated that the invention can be realized by coupling angles that deviate from ±45°, although such a deviation will result in reduced performance due to crosstalk between the sidebands within the filter. Also, it is contemplated that, if the splices are equal but not oppositely signed, the output ports for supplying the different sidebands of the label will be reversed.

The transmission function for each output port of the optical filter shown in FIG. 3 is sinusoidal due to the different propagation constants, $\beta_x$ and $\beta_y$, of the two axes of the polarization maintaining fiber 30. The transmission function of the filter as seen at output port 41 of polarization beam splitter 40 is represented as follows:

$$T = \frac{P_{output}}{P_{input}} = 2\cos^2\left[\frac{(\beta_y - \beta_x)L}{2}\right]. \quad (1)$$

The transmission function of output port 42 of polarization beam splitter 40 is in the same form with a π phase shift.

Free spectral range of the filter, 2δλ, is calculated by taking into account that the dependence on the beat length of the polarization maintaining fiber. For the calculation of the free spectral range, one must take into account the constructive interference of the signals that emerges as the output signal from one output port of polarization beam splitter 40 and the destructive interference of the signals that emerges as the output signal from the other output port of polarization beam splitter 40. If $L_{beat}$ is the beat length of fiber 30, then the wavelengths that constructively interfere are spectrally spaced by the free spectral range of the filter:

$$2\delta\lambda = \frac{L_{Beat}\lambda}{L}. \qquad (2)$$

where the beat length is calculated as:

$$L_{Beat} = \frac{2\pi}{\Delta\beta} = \frac{2\pi}{\Delta n} \cdot \frac{\lambda}{2\pi} = \frac{\lambda}{\Delta n}, \qquad (3)$$

and where $\Delta\beta$ is difference of the propagation constants and $\Delta n$ is the difference of the refractive indices for the orthogonal axes of the polarization maintaining fiber.

As mentioned above, the filter together with a balanced receiver is well suited for optical packet-switched networks where the label information is marked using the FSK optical tones. The maximum of the filter transmission function for output port 41 is tuned to one tone or sideband of the composite signal while the maximum of the filter transmission function for output port 42 is tuned to the second tone. In the FSK label example, the FSK tones or sidebands are spectrally spaced by $\delta\lambda/2$. This is feasible because the free spectral range $2\delta\lambda$ of the filter depends on the length of the fiber. This can be understood with an example from experimental practice in which the two FSK tones are spectrally spaced by 20 GHz. For typical commercially available polarization maintaining fiber having a typical beat length of 3 mm, it is possible to construct a filter with 40 GHz free spectral range using 14.531 meters of fiber 30. One FSK tone will appear at output port 41 and the other FSK tone will appear at output port 42.

Figure 4:
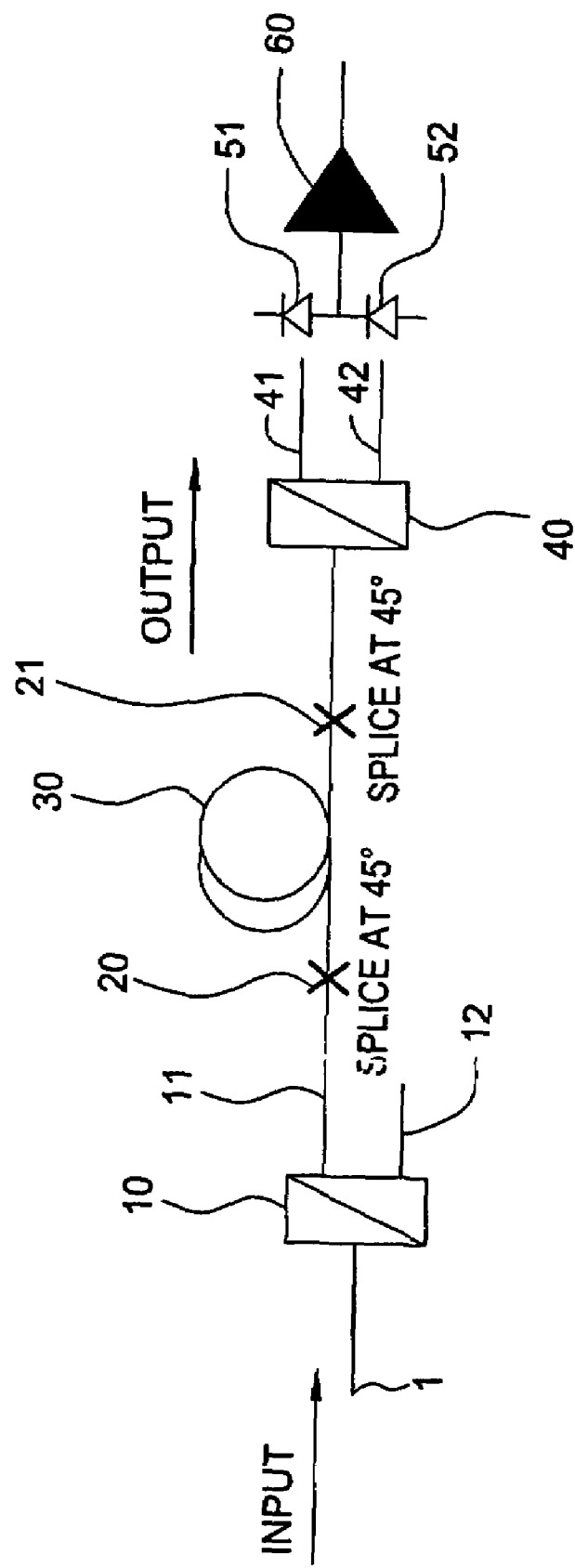

The balanced receiver shown in FIG. 4 together with the optical filter in FIG. 3 comprises photodiodes 51 and 52 and transimpedance amplifier 60. The photodiodes are coupled together in a balanced arrangement as shown with an input to the amplifier 60 connected between the photodiodes. Each photodiodes is disposed to receive a signal from only one of the output ports of polarization beam splitter 40. As shown in FIG. 4, output port 41 is optically coupled to photodiode 51 whereas output port 42 is optically coupled to photodiode 52. The optical signals from output ports 41 and 42 are subtracted from each other and result in an AC-coupled data stream that is the data representation of the reconstructed label.

It is understood by persons skilled in the art that the use of SCM modulation for the wavelength label requires an SCM receiver coupled to the filter as opposed to the balanced receiver shown in FIG. 4. SCM receivers are well known in the art. Since SCM sidebands carry the same information, an effective receiver will add the sidebands as they emerge from the polarization beam splitter ports.

Figure 5:
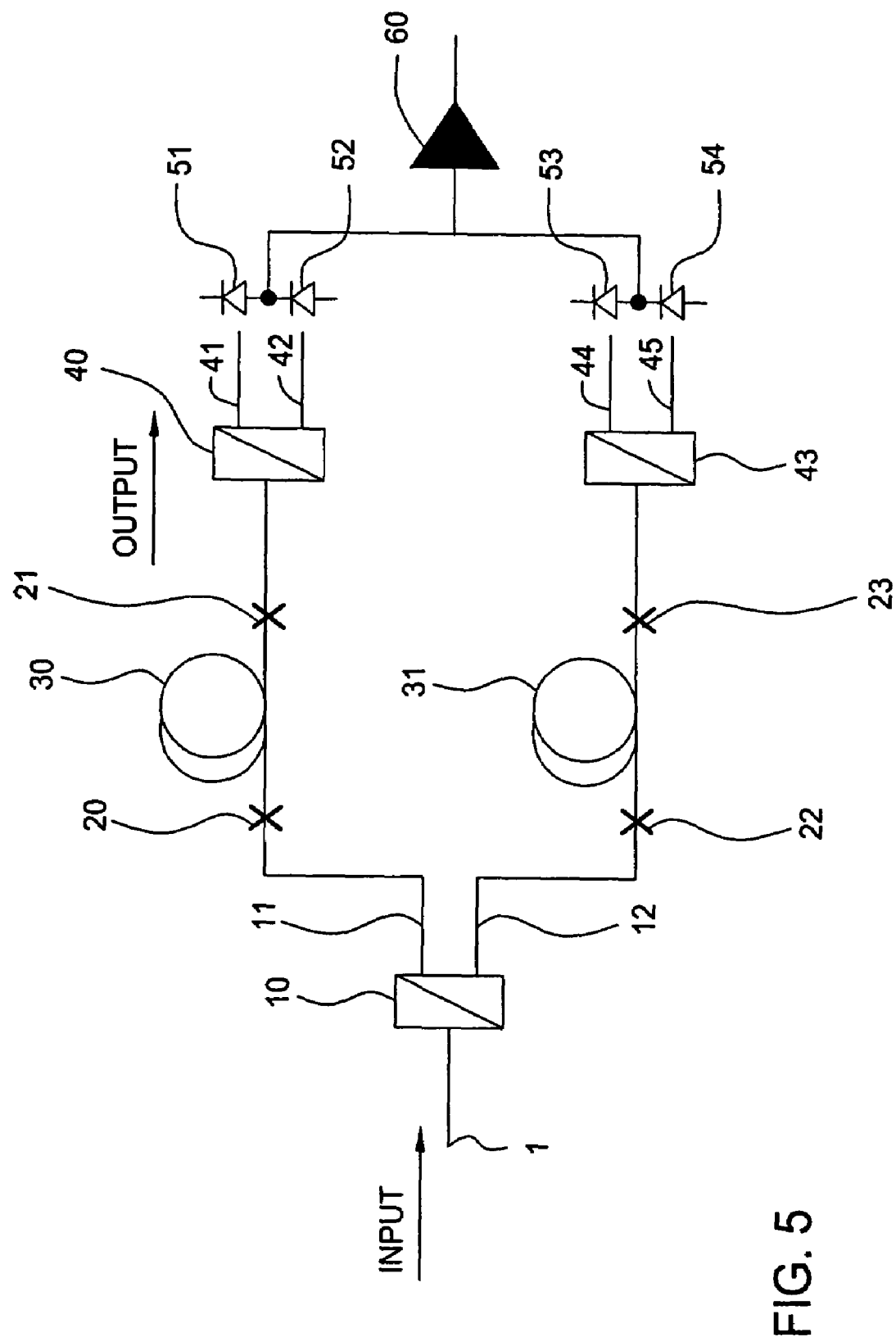
Figure 6:
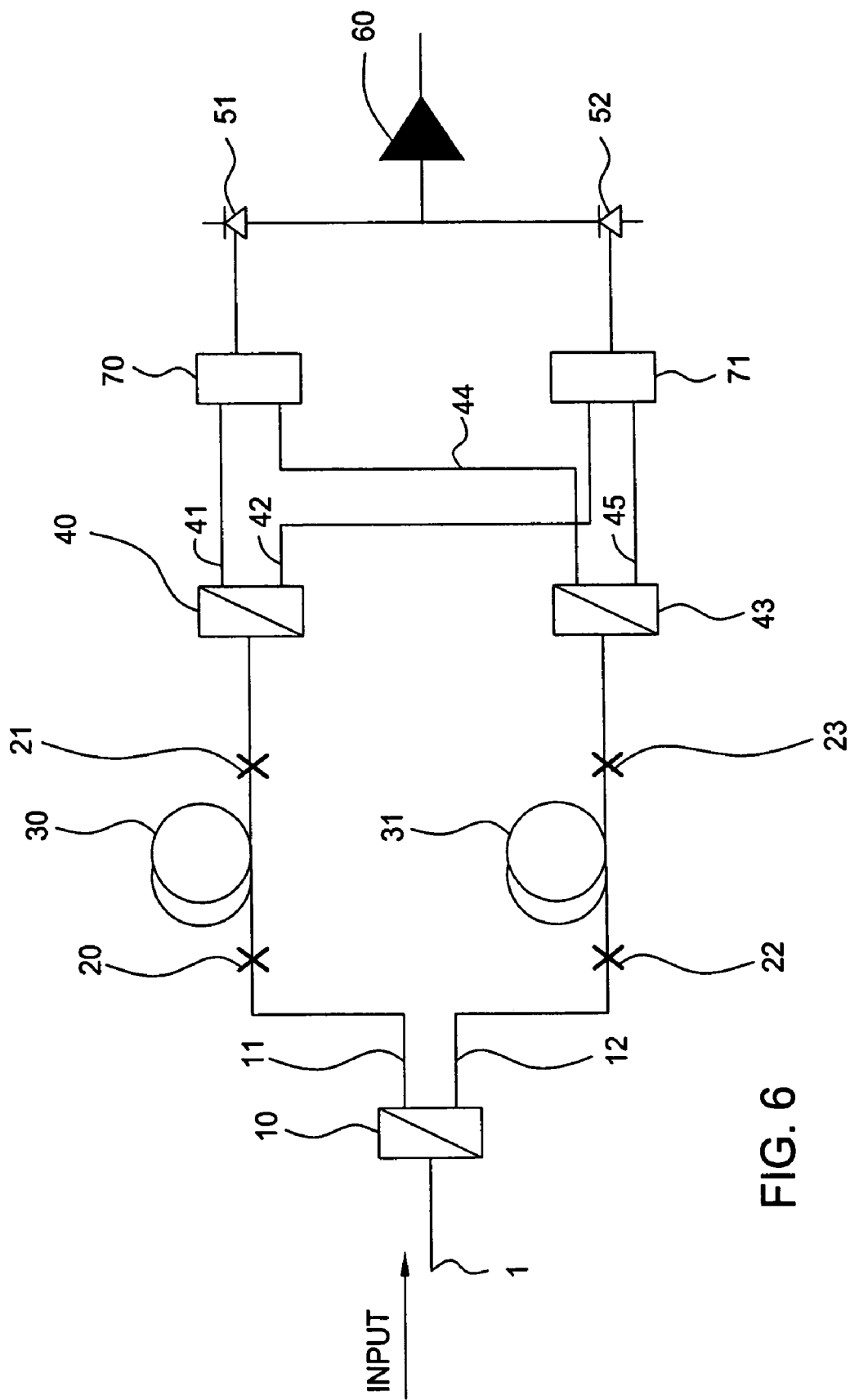

Enhancement of the filter shown in FIGS. 3 and 4 is possible by replicating the first fiber path in a second fiber path between output port 12 and a second output polarization beam splitter 43 as shown in FIGS. 5 and 6. This arrangement is both lossless and input polarization independent. That is, in the case where the polarization of the incoming composite signal is not aligned properly to the ordinary or fast axis of the input polarization beam splitter 10, the composite signal will be split and will emerge from output ports 11 and 12. As discussed for the earlier arrangement shown in FIGS. 3 and 4, this results in power loss and in a decrease of receiver sensitivity. However, when both output ports of polarization beam splitter 10 are used as shown in FIGS. 5 and 6, the entire input signal is used to recover the label thereby retaining the power and significantly enhancing receiver sensitivity. Lossless detection is achieved with only a modest increase in filter and receiver complexity.

In FIG. 5, a double balanced receiver is used after the optical filter to complete the recovery of the label from the FSK sidebands. The double balanced receiver comprises four photodetectors 51 through 54 arranged as separate balanced receivers connected to a transimpedance amplifier 60. One balanced receiver is optically coupled to the output ports of polarization beam splitter 40 while the other balanced receiver is optically coupled to the output ports of polarization beam splitter 43. At the double balanced receiver, the optical signals from output ports 41 and 44 are added, just as the optical signals from output ports 42 and 45 are added together. The resulting sum signals are then subtracted to form the recovered label at the output of amplifier 60.

In FIG. 6, the receiver is simplified to a single balanced receiver while optical elements are employed to sum optically the appropriate signals supplied to the receiver by the output polarization beam splitters 40 and 43. In this filter, the two components of the same optical frequency of the FSK tone are combined in the optical domain. Summation is accomplished using any of a number of known optical combining techniques such as fused fiber couplers or optical combiners or polarization beam splitters where the two output ports serve as inputs for combining the signals. In experimental practice, the latter is preferred because it is substantially lossless and because the whole filter will consist only of polarization maintaining fiber and polarization maintaining fiber pigtailed components resulting in a fully stable device that is insensitive to the polarization state of the incoming composite signal.

Combining elements 70 and 71 are supplied with the appropriate signals from polarization beam splitter 40 and polarization beam splitter 43. As shown in FIG. 6, combining element 70 is supplied with the optical signals relating to the same sideband from output ports 41 and 44 whereas combining element 71 is supplied with the optical signals relating to a different sideband from output ports 42 and 45. The output of each combining element is then optically coupled into a related photodiode of the single balanced receiver.

One significant advantage of the present filter, as described above, is that the filtering function is periodic in the spectrum, unlike the function of a typical optical filter or typical fiber Bragg grating. This means that the filters shown in FIGS. 3 though 6 can be used for any wavelength channel that is related to $\delta\lambda$, the SCM frequency or FSK detuning. For example, in the case of FSK with 10 GHz detuning, by realizing the device for $2\delta\lambda$ equivalent to 20 GHz, the filter operates for any channel having, for example, 50 GHz, 100 GHz or 200 GHz spacings. No specialized tuning is required. One FSK sideband of the label will always arrive at one output port of polarization beam splitter 40 or one of each of the output ports of splitters 40 and 43, and the other FSK sideband of the label will always arrive at the other output port of polarization beam splitter 40 or the other one of each of the output ports of splitters 40 and 43 regardless of the central wavelength (frequency) of the optical channel. This presents an important advantage over other filter designs because it requires no tuning when the input wavelength is changed.

Other important advantages of the filter or filter/receiver combination are that it offers a high suppression ratio that is nearly ideal, because of the sinusoidal transmission function. The dual fiber designs exhibit substantially no power loss in the sense that label and payload is separated and both optical sidebands are detected. This permits the use of balanced optical detection which significantly enhances the overall receiver sensitivity.

For correct operation of the optical devices incorporating dual polarization maintaining fibers, such as segments 30 and 31, it is preferred that the segments be substantially closely matched. Ideal device operation is attained when both fiber segments are exactly matched, that is, they exhibit equal specifications. If the polarization maintaining fiber segments are too different from each other, then the optical device will be adversely affected.

In order to understand the matching accuracy required for fiber segments, it is useful to consider an example in which the tone spacing is 50 GHz and device operation occurs at an optical frequency of approximately 200 THz. This means that operation occurs at the 4000th harmonic of the basic frequency of the device. When a maximum deviation of 10% is allowed, this would translate to a maximum deviation of $\pm 0.1/4000$ or $\pm 2.5 \times 10^{-5}$ in basic frequency and, as a result, in the tolerance of the fiber segment specifications. While such rigid tolerances are achievable, they introduce an added degree of manufacturing precision for these devices.

Figure 7:
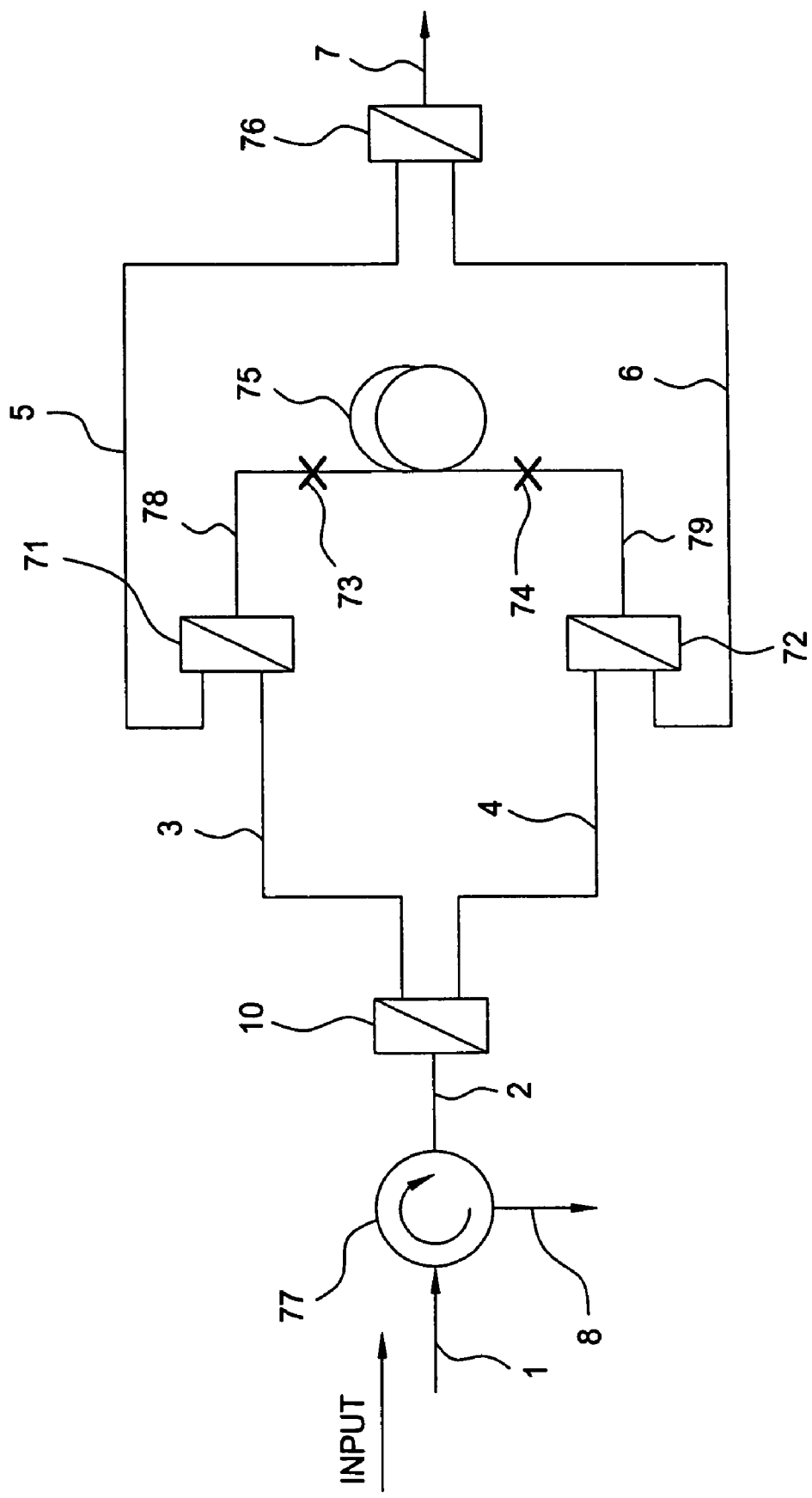

FIG. 7 depicts an optical device that avoids the problems of matching the specifications of separate polarization maintaining fiber segments by utilizing a single polarization maintaining fiber in a bidirectional mode. In this embodiment, the entire device is bidirectional as opposed to the feed-forward devices shown in the previous figures and it reuses a single piece of polarization maintaining fiber (fiber 75) as the optical path for both polarization states. This results in a device having two intertwined paths for the polarization states of the signal which, in turn, reduces the overall device complexity.

The optical device in FIG. 7 includes a device input 1, device outputs 7 and 8, circulator 77, input polarization beam splitter 10, intermediate polarization beam splitters 71 and 72, output polarization beam splitter 76, polarization maintaining fiber 75, splices or polarization rotators 73 and 74, and coupling fibers 2, 3, 4, 5, 6, 78, and 79. It should be noted that the coupling fibers are preferably polarization maintaining fiber while coupling fiber 2 can be either a standard optical fiber or a polarization maintaining fiber.

Circulator 77 is a three port device that separates the input signal arriving at device input 1 from one output signal on device output 8 since coupling fiber 2 is used for bidirectional propagation. The incoming signal at device input 1 is first routed to the second port (coupling fiber 2) of circulator 77. Input polarization beam splitter 10 separates this input signal into a TE polarization component and a TM polarization component. One orthogonal signal component appears at the output of the input polarization beam splitter on coupling fiber 3 while the other orthogonal signal component appears at the output of the input polarization beam splitter on coupling fiber 4.

Coupling fiber 3 routes its optical signal in the forward direction to one port of intermediate polarization beam splitter 71 whereas coupling fiber 4 routes its optical signal in the forward direction to one port of intermediate polarization beam splitter 72. The term "forward directed" is intended to identify those signals that travel from all the beam splitters toward output 7, whereas the term "reverse directed" is intended to identify those signals that travel back from all the beam splitters toward output 8. With respect to the forward directed signals introduced to beam splitters 71 and 72, the respective beam splitter outputs (in the forward direction) appear on fiber 78 for splitter 71 and on fiber 79 for splitter 72.

The bidirectional polarization maintaining path between the intermediate polarization beam splitters is comprised of coupling fiber 78, splice or polarization rotator 73, polarization maintaining fiber 75, splice or polarization rotator 74 and coupling fiber 79.

In the reverse direction, the signal input to splitter 72 on fiber 79 is split with one orthogonal component being output in the reverse direction on coupling fiber 4, and with the other orthogonal component being output in the forward direction on coupling fiber 6. Similarly, the signal input to splitter 71 on fiber 78 is split with one orthogonal component being output in the reverse direction on coupling fiber 3, and with the other orthogonal component being output in the forward direction on coupling fiber 5. The forward directed signals on fibers 5 and 6 are input to output polarization beam splitter 76 where an output signal is supplied to device output 7. The reverse directed signals on fibers 3 and 4 are input (in the reverse direction) to splitter 10 to form the output signal at device output 8.

In the case of SCM operation, optical tones 1 and 2 appear at one device such as output 7 or 8 and the payload appears at the remaining device output such as output 8 or 7. In the case of FSK operation, optical tone 1 appears at one device output such as output 7 or 8 and optical tone 2 appears at the other device output such as output 8 or 7.

It is interesting to note that the path along which one polarization component propagates from element 73 through elements 75, 74, 72, and 10 or 76 performs the same function as the path through elements 20, 30, 21, 40 and 70 or 71 in the earlier figures. Similarly, the path along which the other polarization component propagates from element 74 through elements 75, 73, 71, and 10 or 76 performs the same function as the path through elements 22, 31, 23, 43 and 70 or 71 in the earlier figures.

In operation, the input polarization beam splitter separates the orthogonal components of the input signal and supplies each one to a separate intermediate polarization beam splitter via a coupling fiber. Each orthogonally polarized component of the input signal is output from its respective intermediate polarization beam splitter into an opposite end of the polarization maintaining fiber so that the two polarized signals propagate through the polarization maintaining fiber in opposite directions (contra-directionally). In this way, the output signal from one intermediate polarization beam splitter traverses the splices and the polarization maintaining fiber and enters the other intermediate polarization beam splitter where it is split with orthogonal components supplied to the input and output beam splitters.

In this embodiment, the device outputs are at the output port of the output polarization beam splitter and at the third port of the circulator. In SCM operation, the optical tones appear at one output of the device and the payload appears at the other output. For example, the tones may appear at output 7 while the payload emerges at output 8. In FSK operation, each optical tone appears at one or the other of the device outputs. For example, optical tone 1 can appear at output 7 and optical tone 8 can appear at output 8.

As a combined entity, elements 71-75 cooperate to perform a wavelength dependent polarization transformation resulting in a wavelength dependent distribution of the input signal in fiber 1 over device output ports coupled to fibers 7 and 8. For example, in the forward direction, the signals that arrive on fiber 4 are directed to and then transformed by the polarization maintaining branch including elements 73-75 so that they are distributed over fiber 5 in the forward direction and fiber 3 in the reverse direction. Distribution ratios are wavelength dependent and range from 0:1 to 1:0. On the other hand, signals that arrive on fiber 3 are directed to and then transformed by the polarization maintaining branch including elements 73-75 so that they are distributed over fiber 6 in the forward direction and fiber 4 in the reverse direction.

While the foregoing is directed to embodiments of the present invention, other and further embodiments of the invention may be devised without departing from the basic scope thereof, and the scope thereof is determined by the claims that follow. It is contemplated that the present invention can be used to separate the payload from the label, either from one or both sidebands (tones).

The invention claimed is:

1. An optical device for extracting at least one of first and second optical streams of data from an optical signal at a wavelength $\lambda_c$ wherein the data streams are separated by a predetermined wavelength difference $\delta\lambda$, the device comprising:
    an input polarization beam splitter including both an input port for receiving said optical signal and first and second output ports defined by respective orthogonal polarization states;
    an intermediate polarization transformation element coupled to receive orthogonal optical signals output from the input polarization beam splitter at first and second inputs and to polarization transform and cross-over the received optical signals to second and first outputs respectively, the intermediate polarization transformation element further including a polarization maintaining fiber having a primary polarization axis, the fiber being disposed to support contra-directional propagation of the received orthogonal optical signals so that optical signals received at the first input are transformed and supplied at least in part to the second output and so that optical signals received at the second input are transformed and supplied at least in part to the first output, the primary polarization axis at a first end of the fiber being disposed at a predetermined angle relative to first output port of the input polarization beam splitter and the primary polarization axis at a second end of the fiber being disposed at a second angle relative to the second output port of the input polarization beam splitter, the second angle being related to the predetermined angle, the fiber being characterized by a beat length $L_{beat}$, wherein the fiber has a length substantially equal to $(L_{beat} \times \lambda_c)/2\delta\lambda$; and
    an output polarization beam splitter having an output port and first and second input ports defined by substantially orthogonal polarization states, the first and second input ports of the output polarization beam splitter being coupled to the first and second outputs of the intermediate polarization transformation element, one of the first and second optical data streams being output from the output port of the output polarization beam splitter.

2. The optical device as defined in claim 1 wherein the predetermined angle is substantially equal in magnitude and opposite in sign to the second angle.

3. The optical device as defined in claim 2 wherein the data streams are components of a data signal received with said optical signal as FSK modulation thereon.

4. The optical device as defined in claim 2 wherein the data streams are components of a data signal received with said optical signal as sub-carrier modulated sidebands therein.

5. The optical device as defined in claim 1 further including an optical circulator having first, second, and third ports, said second port coupled to the input port of said input polarization beam splitter, said first port for receiving the optical signal, and said third port for outputting the other of the first and second optical data streams.

6. An optical device for extracting at least one of first and second optical streams of data from an input optical signal at a wavelength $\lambda_c$, wherein the data streams are separated by a predetermined wavelength difference $\delta\lambda$, the optical device comprising:
    first, second, third, and fourth polarization beam splitters, each splitter having first, second and third ports, each port for supplying and receiving optical signals; and
    a polarization maintaining fiber having a primary polarization axis, the fiber being coupled at one end to the third port of the second splitter at a predetermined angle to the primary polarization axis and at an opposite end to the third port of the third splitter at a second angle to the primary polarization axis, the second angle being related to the predetermined angle, the fiber being characterized by a beat length $L_{beat}$, wherein the fiber has a length substantially equal to $(L_{beat} \times \lambda_c)/2\delta\lambda$;
    wherein the first port of the first splitter receives the input optical signal and the third port of the fourth splitter outputs one of the data streams, the second port of the first splitter is coupled to the first port of the second splitter, the third port of the first splitter is coupled to the first port of the third splitter, the second port of the second splitter is coupled to the first port of the fourth splitter, and the second port of the third splitter is coupled to the second port of the fourth splitter.

7. The optical device as defined in claim 6 wherein the predetermined angle is substantially equal in magnitude and opposite in sign to the second angle.

8. The optical device as defined in claim 7 wherein the data streams are components of a data signal received with said optical signal as FSK modulation thereon.

9. The optical device as defined in claim 7 wherein the data streams are components of a data signal received with said optical signal as sub-carrier modulated sidebands therein.

10. An optical device for extracting at least one of first and second optical streams of data from an input optical signal at a wavelength $\lambda_c$, wherein the data streams are separated by a predetermined wavelength difference $\delta\lambda$, the optical device comprising:
    first, second, third, and fourth polarization beam splitters, each splitter having first, second and third ports, each port for supplying and receiving optical signals;
    a polarization maintaining fiber having a primary polarization axis, the fiber being coupled at one end to the third port of the second splitter at a predetermined angle to the primary polarization axis and at an opposite end to the third port of the third splitter at a second angle to the primary polarization axis, the second angle being related to the predetermined angle, the fiber being characterized by a beat length $L_{beat}$, wherein the fiber has a length substantially equal to $(L_{beat} \times \lambda_c)/2\delta\lambda$; and
    an optical circulator having first, second, and third ports, said second port of the circulator coupled to the first port of the first splitter;

wherein the first port of the circulator receives the input optical signal and the third port of the fourth splitter outputs one of the first and second optical data streams, the third port of the circulation outputs the other of the first and second optical data streams, the second port of the first splitter is coupled to the first port of the second splitter, the third port of the first splitter is coupled to the first port of the third splitter, the second port of the second splitter is coupled to the first port of the fourth splitter, and the second port of the third splitter is coupled to the second port of the fourth splitter.

11. The optical device as defined in claim 10 further comprising at least a first optical polarization rotator, the at least first optical polarization rotator being coupled between the one end of the polarization maintaining fiber and the third port of the second splitter, the optical polarization rotator for providing the predetermined angle of rotation with respect to the primary polarization axis.

12. The optical device as defined in claim 11 further comprising at least a first and second optical polarization rotators, the second optical polarization rotator being coupled between the opposite end of the polarization maintaining fiber and the third port of the third splitter, the optical polarization rotator for providing the second angle of rotation with respect to the primary polarization axis.

* * * * *